United States Patent
Amiet et al.

[11] Patent Number: 5,818,177
[45] Date of Patent: Oct. 6, 1998

[54] VARIABLE-RELUCTANCE SYNCHRONOUS ELECTRIC LINEAR ACTUATOR

[75] Inventors: Michel Amiet, Paris; Jean Lucidarme, Sainte-Genevieve Desbois, both of France

[73] Assignee: Etat Francais Represente Par La Delegue General Pour L'Armement, Paris, France

[21] Appl. No.: 777,050

[22] Filed: Dec. 30, 1996

[30] Foreign Application Priority Data

Dec. 29, 1995 [FR] France ................... 95 15703

[51] Int. Cl.⁶ ............ H02K 41/02; H02K 37/00
[52] U.S. Cl. .................. 318/135; 310/14; 310/12
[58] Field of Search ................ 310/12, 13, 14; 318/135

[56] References Cited

FOREIGN PATENT DOCUMENTS

| | | |
|---|---|---|
| A-0 004 995 | 10/1979 | European Pat. Off. |
| A-0 218 521 | 4/1987 | European Pat. Off. |
| A-0 291 638 | 11/1988 | European Pat. Off. |
| A-0 348 851 | 1/1990 | European Pat. Off. |
| A-2 198 299 | 3/1974 | France . |

*Primary Examiner*—Steven L. Stephan
*Assistant Examiner*—Judson H. Jones
*Attorney, Agent, or Firm*—Oliff & Berridge, PLC

[57] ABSTRACT

An electrical linear actuator includes a stator assembly and a piston structure. The stator assembly includes a casing having a bore extending therethrough and about a longitudinal axis, a winding structure disposed within the bore and in contact with the casing and a plurality of stator elements connected to the winding structure and arranged circumferentially in a plurality of rows extending parallel to the longitudinal axis within the bore and disposed apart from one another to form longitudinally extending channels between adjacent ones of the rows. Each of the stator elements extends radially inwardly from the winding structure toward the longitudinal axis. The piston structure includes a shaft extending along the longitudinal axis and has an outer cylindrical surface and a plurality of piston elements arranged circumferentially in a plurality of rows extending parallel to the longitudinal axis. Each of the piston elements is connected to the outer cylindrical surface of the shaft and extends radially outwardly therefrom relative to the longitudinal axis. The piston structure is sized and adapted to be slidably received by and linearly movable within the stator assembly with each piston element being disposed within a respective one of the channels so that a gap is formed between facially opposing surfaces of the stator elements and the piston elements.

20 Claims, 4 Drawing Sheets

VARIABLE-RELUCTANCE SYNCHRONOUS ELECTRIC LINEAR ACTUATOR

BACKGROUND OF THE INVENTION

1. Field of the Invention

The present invention relates to a variable-reluctance synchronous linear electrical actuator and relates, in particular, to an electrical linear actuator of the type having a stator and a piston, both of which have elements in a form of plates or teeth disposed parallel to the direction of displacement of the piston.

2. Description of the Related Art

At the present time, there are three types of actuators, namely, hydraulic, pneumatic and electrical actuators.

Among electrical actuators, there are already linear actuators that are either a pure variable-reluctance type or a hybrid variable-reluctance type (i.e., those that use magnets for excitation). Electrical actuators have far less thrust than the pneumatic or hydraulic actuators. However, there are linear electrical actuators with a strong thrust that use electromagnets, in which, due to their design, the thrusting force is a result of a normal component of the magnetic field. However, this strong thrust is possible over only short distances.

Thus, electrical actuators cannot compete with pneumatic actuators (and still less with hydraulic actuators) because, when electrical actuators have a high specific thrust, they traverse only short distances. It would, therefore, be useful to obtain electrical actuators with capacities at least similar to those of pneumatic actuators because, unlike compressed air, electricity allows very precise positioning and flexibility in control and, hence, movement.

In French patent 2,588,131, the design and function of a discoid rotating machine as well as several electromagnetic unit structures associated with permanent magnets are described using a variable-reluctance synchronous motor. This discoid rotating machine generates rotational movement and hence does not have the problems associated with linear actuators that the present invention addresses, namely generating a strong thrust or an acceleration over significant linear distances.

In French patent 2,588,133, the design and function of a pure variable-reluctance synchronous linear actuator, capable of substantial thrusts over long linear distances, is described. This variable-reluctance actuator has a stator and a piston having a core bearing thin ferromagnetic blades that are parallel to each other and parallel to the direction of movement of the piston. Each of the thin ferromagnetic blades is divided in a lengthwise direction, i.e., in the direction of movement of the piston, into blocks with a specified pitch. The ferromagnetic circuit of each winding also has several thin blades alternating with those supported by the core which are also divided into blocks with the same pitch as that of the blocks of the core blades.

However, this pure variable-reluctance actuator has drawbacks. First, its design does not allow proper functioning with large air gaps without a deterioration in performance. Second, the blocks located at the ends of a blade undergo substantial perpendicular stresses when moving thereby causing parasitic movement of the blades. This parasitic movement, that is perpendicular to the desired movement, render the moving blades unstable. This is a phenomenon called "end effect."

To overcome these drawbacks and to retain the smallest possible air gaps, blade-type actuators with blocks of movable blades and blocks of fixed blades rubbing against each other have been designed. However, such actuators wear out quickly, generate undesirable heat, and are structures.

Moreover, to have an electrical linear actuator with a regular thrust, it is advisable to use a hybrid variable-reluctance actuator, that is, an electrical linear actuator having permanent magnets.

However, it is difficult to manufacture lamellar devices with alternating permanent magnets properly aligned with other structures.

OBJECTS OF THE INVENTION

Hence, an object of the present invention is to obtain an electrical actuator of the type having a stator and a piston with performance capabilities comparable to those of pneumatic actuators, particularly ones having a strong thrust or an acceleration over a long distance.

Another object of the present invention is to provide an electrical actuator that has no "end effect" and minimal friction when the piston moves.

Yet another object of the present invention is to provide an electrical actuator that is simple to manufacture.

SUMMARY OF THE INVENTION

According to the present invention, an electrical linear actuator includes an assembly and a structure. An electrical linear actuator includes a stator assembly and a piston structure. The stator assembly includes a casing having a bore extending therethrough and about a longitudinal axis, a winding structure disposed within the bore and in contact with the casing and a plurality of stator elements connected to the winding structure and arranged circumferentially in a plurality of rows extending parallel to the longitudinal axis within the bore and disposed apart from one another to form longitudinally extending channels between adjacent ones of the rows. Each of the stator elements extends radially inwardly from the winding structure toward the longitudinal axis. The piston structure includes a shaft extending along the longitudinal axis and has an outer cylindrical surface and a plurality of piston elements arranged circumferentially in a plurality of rows extending parallel to the longitudinal axis. Each of the piston elements is connected to the outer cylindrical surface of the shaft and extends radially outwardly therefrom relative to the longitudinal axis. The piston structure is sized and adapted to be slidably received by and linearly movable within the stator assembly with each piston element being disposed within a respective one of the channels so that a gap is formed between facially opposing surfaces of the stator elements and the piston elements.

It is preferred that one of the plurality of stator elements and piston elements is ferromagnetic and the other one of the plurality of stator elements and the piston elements is non ferromagnetic. Further, is preferable that each one of the plurality of the stator elements and the piston elements which are non ferromagnetic includes a plurality of magnets. The plurality of magnets includes a first group of magnets having a first polarity and a second group of magnets having a second polarity different from the first group of magnets. Individual ones of the magnets extend along the surface of the plurality of the stator elements and the piston elements which are non ferromagnetic in a direction parallel to the longitudinal axis. Preferably, the plurality of magnets are arranged whereby adjacent ones of the magnets have a different polarity.

Each row of the stator elements and the piston elements can be either an elongated plate or a plurality of teeth spaced apart from each other in a direction parallel to the longitudinal axis to form a slot between consecutive ones of the teeth. It is preferred that when adjacent rows of at least one of the stator elements and the piston elements is a plurality of teeth, the plurality of teeth are arranged in a manner whereby the teeth of adjacent rows are offset from one another. Preferably, when the teeth of adjacent rows are offset from one another, each of the plurality of teeth of one row is disposed centrally and opposite to a corresponding slot in the adjacent row of the plurality of teeth. Although not by way of limitation, preferably, at least each one of a plurality of stator elements and the piston elements is configured in cross-section as a trapezoid.

DETAILED DESCRIPTION OF THE PREFERRED EMBODIMENT

Figure 1:
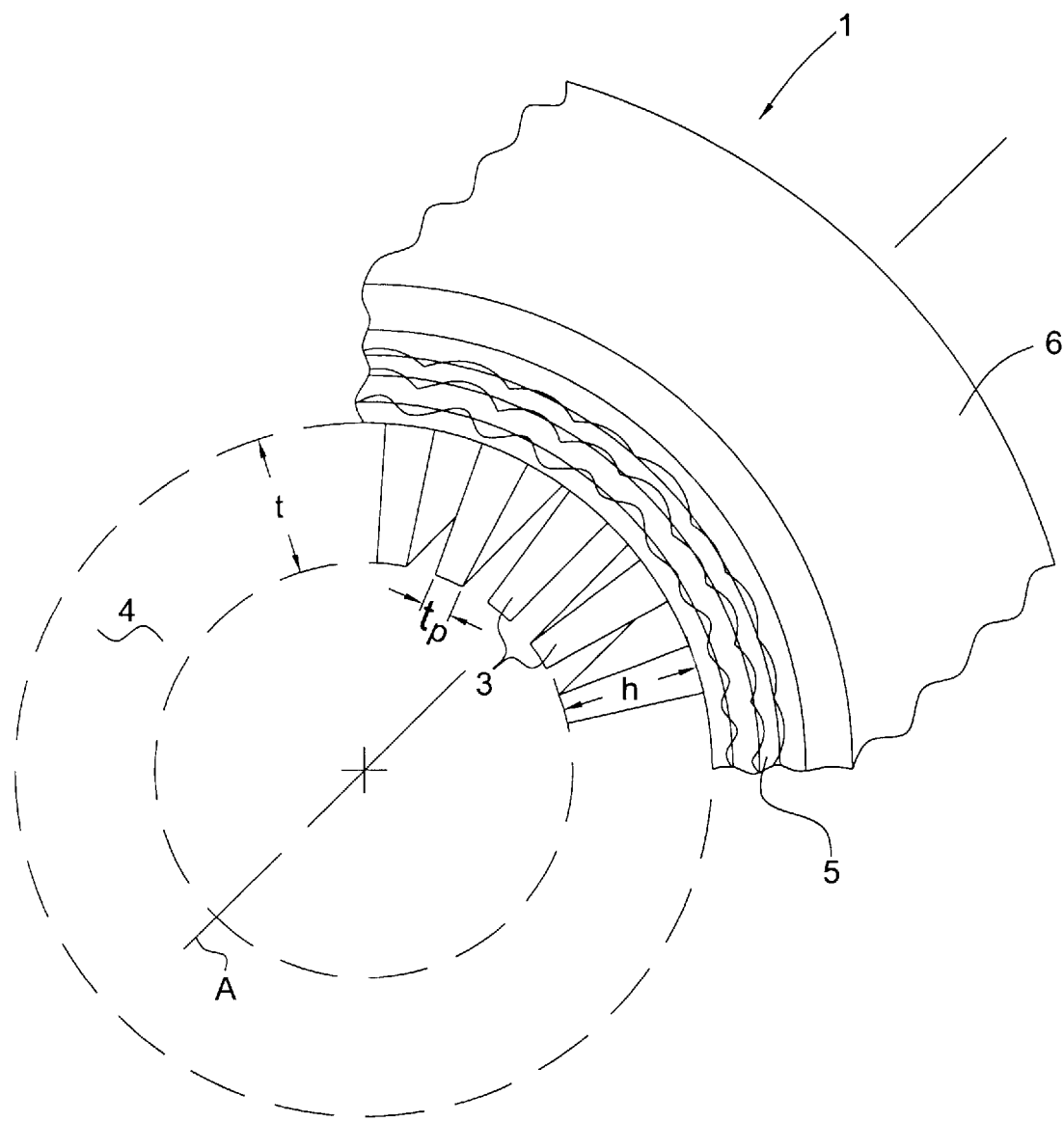
FIG. 1 is a partial perspective view of a drawn stator, a component of the present invention.

As shown in FIG. 1, a stator assembly 1 is composed of stator elements in a form of a set of plates 3 of equal lengths made of a non ferromagnetic material. The plates 3 are disposed apart from one another and are regularly distributed over a matrix 4 having a tubular shape whose axis "A" corresponds to that of a piston structure or piston 2, shown in FIG. 3, and whose thickness "t" corresponds to the height "h" of the plates 3. Axis "A" extends in a longitudinal direction. The plates 3 have a trapezoidal cross-sectional configuration.

The plates 3 are surrounded by a winding structure 5 that generates an induced magnetic field. The winding structure 5 is itself surrounded by a ferromagnetic casing 6.

The stator assembly 1 comprises a plurality of plates 3, the winding structure 5, and the casing 6 and is attached at each of its two ends to a ferromagnetic flange, not shown, in the shape of a crown. This configuration allows the piston 2 to slide inside the stator assembly in the longitudinal direction.

Figure 2:
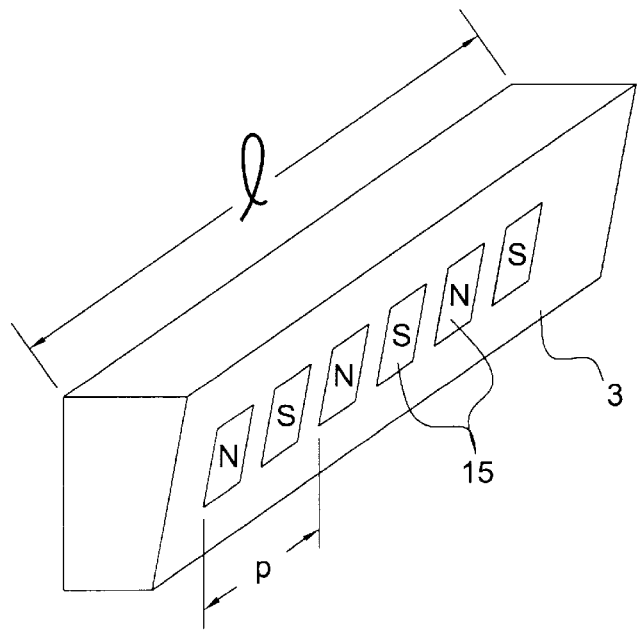
FIG. 2 is a perspective view of a plate shown in FIG. 1.

As shown in FIG. 2, a plurality of magnets 15 are inserted into each of the plates 3 forming a jacket such that the polarity of the magnets 15 alternates in the lengthwise direction "l" corresponding to the direction of displacement of the piston. Thus, the polarity of the magnets 15 is normal to the lengthwise direction "l" of the plates 3.

Figure 5:
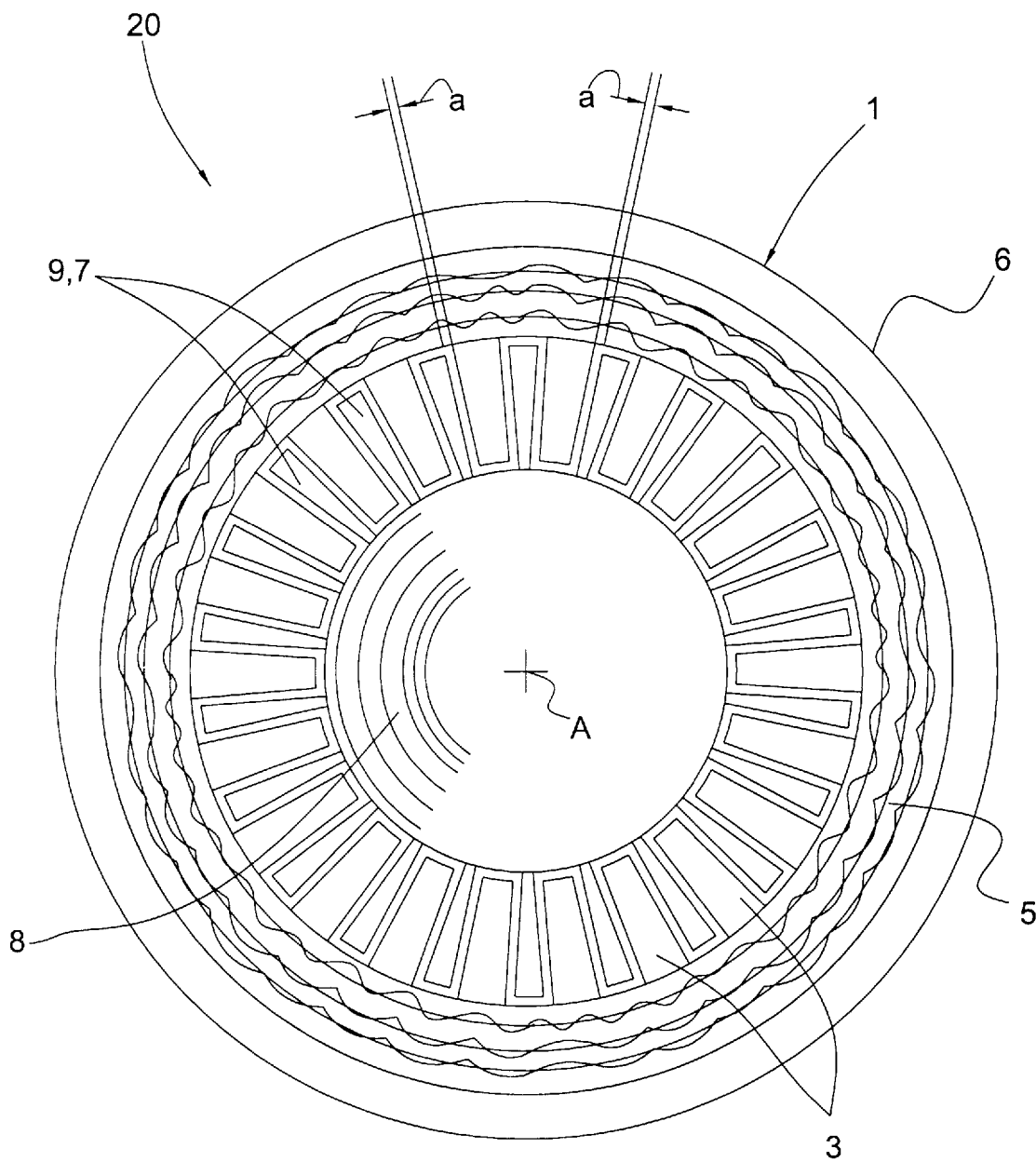
FIG. 5 is a side view in elevation of an actuator of the present invention.

The distance between two magnets of the same polarity in the lengthwise direction "l" defines a pitch "p" of an actuator 20 (shown in FIG. 5).

They can be inserted by gluing in pre-cut holes, by casting, or by any other means.

The winding structure 5 is associated with a power supply circuit that can have a source of direct current and a chopper providing the winding structure 5 with cyclic pulses synchronized with the displacement, with the chopper possibly being controlled by a piston displacement sensor.

Figure 3:
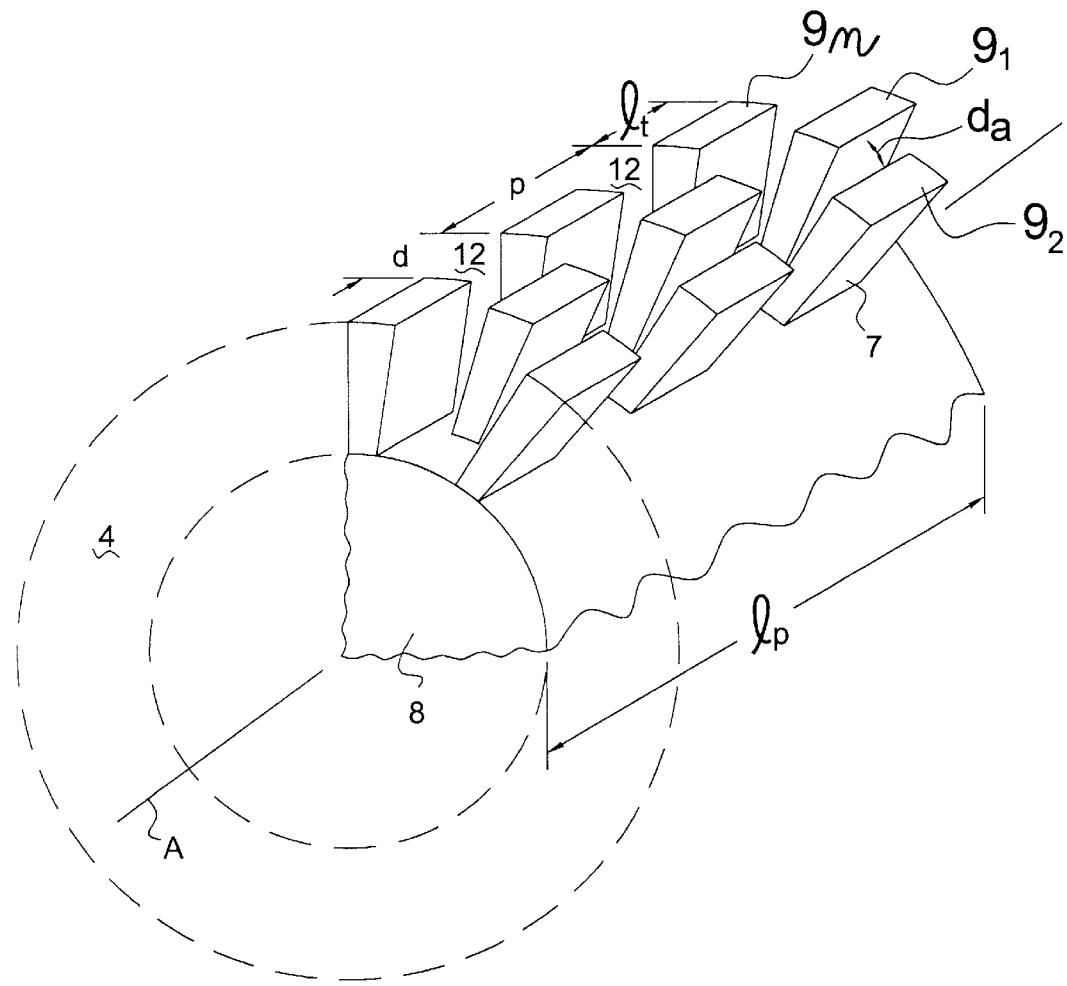
FIG. 3 is a partial perspective view of a piston, a component of the present invention.

The piston 2, shown in FIG. 3, has a cross-sectional shape of a star with a plurality of arms $9_1, 9_2 \ldots 9_n$. Each arm $9_1 \ldots 9_n$ of the star is composed of teeth 7 arranged along the pitch "p" of the actuator 20 and whose length "lt" (in the direction of displacement of the piston) is slightly less than pitch "p", for example, approximately 80% of the pitch. The distance "d" of a slot 12 formed between consecutive ones of the teeth is hence, in this example, approximately 20% of pitch "p".

The teeth 7, made of ferromagnetic material, are attached to an outer cylindrical surface of a shaft 8 made preferably of nonmagnetic material, or even of insulating material especially if the piston 2 is designed to move rapidly.

In addition, the teeth 7 of two adjacent arms, for example, $9_1$ and $9_2$, are not opposite each other but offset such that the center of symmetry of one tooth 7 of, for example, arm $9_1$ is opposite the center of a corresponding slot 12 between two consecutive teeth of arm $9_2$. This produces a staggered tooth design.

A distance "da" between two consecutive arms, for example, $9_1$ and $9_2$, is slightly greater than the thickness "tp" of one plate 3 of the stator assembly 1, as shown in FIG. 1, thus constituting a set of air gaps "a" which can be large, in this case on the order of a millimeter.

Thus, when assembled, piston 2 can slide in the stator assembly 1 along the longitudinal axis "A".

Figure 4:
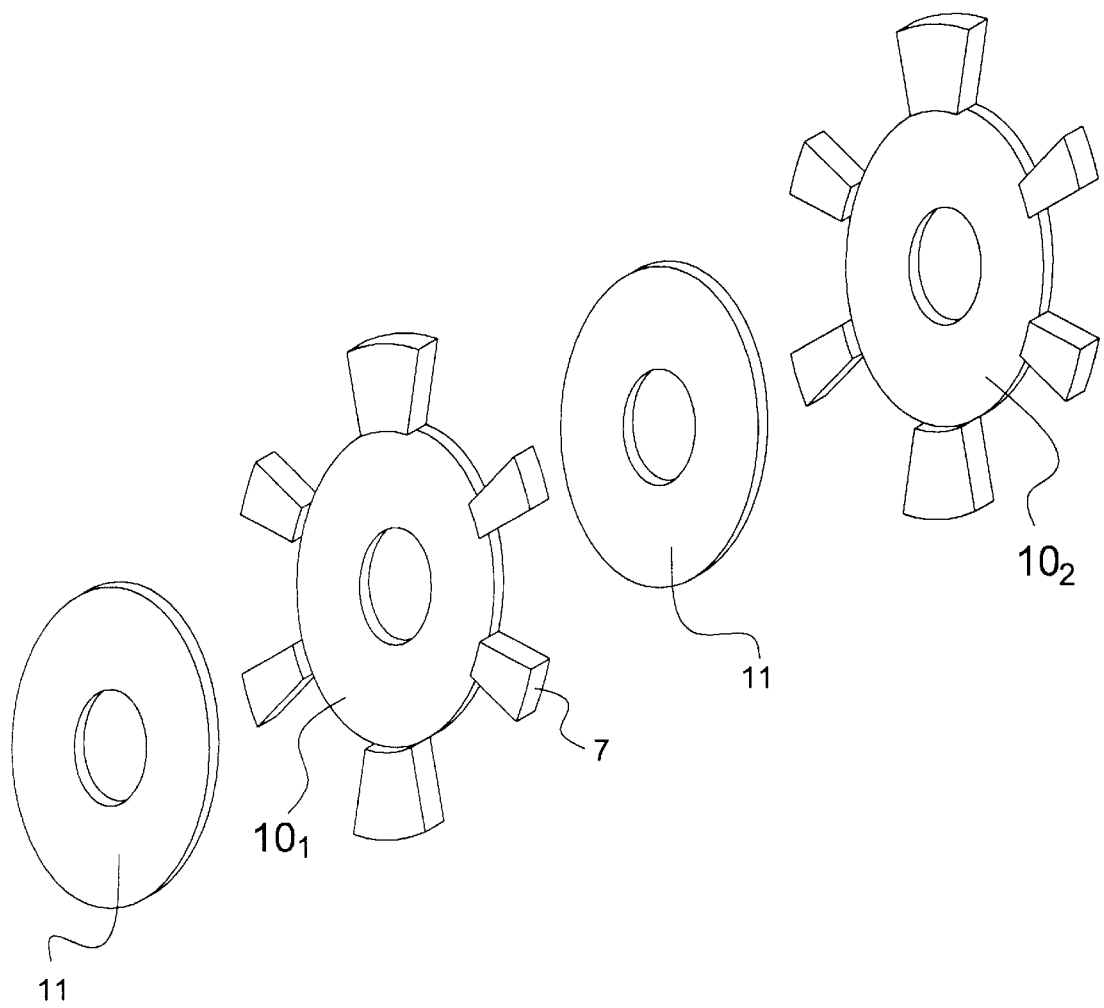
FIG. 4 is a perspective view of a pair of piston segments and a pair of washers.

As shown in FIG. 4, the staggered tooth design can be obtained advantageously by the assembly of identical piston segments $10_1$ and $10_2$ having a shape of a toothed wheel. Each of these toothed wheels has one-half the number of teeth 7 as the piston 2 has arms 9. The distance between two adjacent arms, for example, $9_1$ and $9_2$ of a piston segment $10_1$ or $10_2$ is equal to the sum of the width of one tooth, twice the thickness of plates 3 of the stator assembly 1 and the sets of air gaps "a".

The piston 2 is made by attaching to a washer 11 between a succession of piston segments $10_1$ and $10_2$. The piston segments $10_1$ and $10_2$ being disposed such that the center of symmetry of one tooth 7 of first piston segment $10_1$ is opposite the center of symmetry of a space separating two successive teeth of piston segment $10_2$. The lengthwise spacing between the teeth 7 of two consecutive arms $9_1$ and $9_2$, corresponding respectively to the teeth of the piston segments, is effected by the washer 11.

The problem of locking the piston segments $10_1$ and $10_2$ rotationally on the shaft 8 is solved simply by applying compression to the shaft 8 having a shoulder and being tapped to receive a nut as would be understood by one of ordinary skill in the art.

The piston segments $10_1$ and $10_2$ can, for example, be made by casting.

A length "lp" of the piston 2 is greater than a length "ls" of the stator assembly 1 and, more precisely, that of the hollow cylinder limited by the two flanges.

To facilitate translation of the piston 2 relative to the stator assembly 1, bushings with balls can be used, placed between the stator assembly and the piston 2, outside the cylinder delimited by the flanges.

Angular positioning of the piston 2 relative to the stator assembly 1 can advantageously be effected by using guide arms connected to the piston 2 and sliding in adjustable slides attached to the stator and having ball bearings.

Without this positioning provision, the stator assembly and the piston would stick to each other.

Thus, in an electrical actuator, the stator plates all have the same environment, due to their cylindrical distribution, which eliminates any end effect and facilitates angular positioning because of the possibility of using large air gaps.

To cause the piston to operate, an electrical current whose intensity is of the pulsed type is supplied to the winding structure 5. Thus, a synchronous magnetic field is created which is the source of a force that causes the piston to move translationally relative to the stator assembly.

One of ordinary skill in the art would appreciate that numerous modifications could be made to the preferred embodiment described above. Thus, the actuator described is of the single-phase type. However, a multi-phase actuator could easily be made, with n phases, by disposing several stator elements with an out-of-phase excitation of T/n along the piston, where T is the period of time of the supply current and n the number of phases.

In such a configuration, each stator element must have the same pitch, the pitch of the actuator, which is also the pitch of the piston. However, the positions of the stator elements must be such that, relative to the piston teeth, when the magnets of the first stator element coincide, those of the second stator element are offset by p/n, where p is the pitch of the actuator, those of the third stator element, if any, are offset by 2 p/n, etc.

Moreover, in the embodiment described above, where the piston is completely passive, the source elements of the magnetic field, whether it is induced like the coil or an inducer like the magnets, are all in the stator assembly.

Thus, it is easy to make an actuator in which the magnets are in the piston plates instead of being in the stator assembly, retaining the same principle of a cylindrical synchronous design, with a star-shaped piston provided with toothed arms, and with a stator provided with plates between which the piston slides, the plates being surrounded by a coil. The difference resides in the fact that the nonferromagnetic plates of the stator assembly provided with magnets are replaced by ferromagnetic teeth.

It can also be seen that an actuator according to the invention can function like a piston accelerator, and the latter can then become a projectile. Under these conditions, the actuator is an electrical launcher whose acceleration is conditioned by the order of ignition of the phases of the stator elements.

What is claimed is:

1. A variable-reluctance synchronous electrical linear actuator, comprising:
a stator assembly including a plurality of stator plates; and
a piston including a plurality of piston plates with the stator plates and piston plates disposed parallel to a longitudinal direction of displacement of the piston, whereby the stator plates and the piston plates are disposed alternately over a matrix having a tubular shape, with each one of the stator plates positioned between respective consecutive ones of the piston plates in a substantially facially-opposing relationship.

2. A hybrid variable-reluctance synchronous electrical linear actuator, comprising:
a stator assembly including a plurality of stator plates; and
a piston having a plurality of piston plates, the stator plates and the piston plates being disposed parallel to a longitudinal direction of displacement of the piston with one of the plurality of the stator plates and piston plates being ferromagnetic with each plate being divided in a lengthwise direction into a plurality of teeth with a specified pitch therebetween, a remaining one of the plurality of stator plates and the piston plates being nonferromagnetic and having a plurality of magnets with individual ones of the magnets disposed at regular intervals along the lengthwise direction, the stator plates alternating with the piston plates, whereby the stator plates and the piston plates are disposed in a cylindrical configuration with each tooth being separated from the adjacent nonferromagnetic plates by an air gap.

3. A hybrid variable-reluctance synchronous electrical linear actuator according to claim 2, wherein the stator plates and the piston plates are disposed over a matrix having a tubular shape.

4. A hybrid variable-reluctance synchronous electrical linear actuator according to claim 2, wherein the plurality of the magnets includes a first group of magnets having a first plurality and a second group of magnets having a second plurality different from the first plurality and are disposed along a side of at least the nonferromagnetic plates in the lengthwise direction and in a spaced apart relationship, whereby individual ones of the magnets of the first group and the second group are alternately arranged.

5. A hybrid variable-reluctance synchronous electrical linear actuator according to claim 2, wherein the piston has a shaft made of a nonmagnetic material with toothed ferromagnetic plates and wherein the stator assembly has a winding structure and nonferromagnetic plates and ferromagnetic plates disposed in an alternating manner with respect to one another, whereby at least the nonferromagnetic plates including the plurality of magnets connected thereto are disposed in the lengthwise direction and in a spaced apart relationship.

6. A hybrid variable-reluctance synchronous electrical linear actuator according to claim 5, wherein the teeth of an arm of the piston are staggered with respect to the teeth of adjacent arms of the piston.

7. A hybrid variable-reluctance synchronous electrical linear actuator according to claim 6, wherein the stator assembly has n stator elements offset in the lengthwise direction by p/n where p is equal to the specified pitch and further comprising a power supply connected to the winding structure whereby power is supplied in time intervals equal to T/n where T is a period of time that the power is supplied.

8. A hybrid variable-reluctance synchronous electrical linear actuator according to claim 2, further comprising means of guiding the piston translationally and rotationally.

9. A hybrid variable-reluctance synchronous electrical linear actuator according to claim 8, wherein the guide means has at least one guide arm formed integrally with the piston and further comprising a plurality of ball bearings joined to the stator assembly by support means.

10. A hybrid variable-reluctance synchronous electrical linear actuator according to claim 2, wherein the stator assembly has a winding structure with toothed ferromagnetic plates and the piston has nonferromagnetic plates alternatingly disposed between consecutive ones of ferromagnetic plates whereby at least the nonferromagnetic plates of the piston include a plurality of magnets disposed in the lengthwise direction and in a spaced apart relationship along at least one side of the plate.

11. A hybrid variable-reluctance synchronous electrical linear actuator according to claim 2, wherein the piston disposed within the stator assembly is projected therefrom upon actuation of the actuator.

12. An electrical linear actuator, comprising:
a stator assembly including a casing having a bore extending therethrough and about a longitudinal axis, a winding structure disposed within the bore and in contact with the casing and a plurality of stator elements connected to the winding structure and arranged circumferentially in a plurality of rows extending parallel to the longitudinal axis within the bore and disposed apart from one another to form longitudinally extending channels between adjacent ones of the rows, each of the stator elements extending radially inwardly from the winding structure toward the longitudinal axis; and a piston structure including a shaft extending along the longitudinal axis and having an outer cylindrical surface and a plurality of piston elements arranged circumferentially in a plurality of rows extending parallel to the longitudinal axis, each of the piston elements connected to the outer cylindrical surface of the shaft and extending radially outwardly therefrom relative to the longitudinal axis whereby the piston structure is sized and adapted to be slidably received by and linearly movable within the stator assembly with each piston element being disposed within a respective one of the channels in a manner that a gap is formed between facially opposing surfaces of the stator elements and the piston elements.

13. An electrical linear actuator according to claim 12, wherein one of the plurality of stator elements and the piston elements is ferromagnetic and a remaining one of the plurality of stator elements and the piston elements is nonferromagnetic.

14. An electrical linear actuator according to claim 13, wherein each one of the plurality of stator elements and piston elements being nonferromagnetic includes a plurality of magnets including a first group of magnets having a first polarity and a second group of magnets having a second polarity different from the first group of magnets extending along the surface thereof in a direction parallel to the longitudinal axis.

15. An electrical linear actuator according to claim 14, wherein adjacent ones of the magnets have a different polarity.

16. An electrical linear actuator according to claim 12, wherein each row of at least one of the stator elements and the piston elements is an elongated plate.

17. An electrical linear actuator according to claim 12, wherein each row of at least one of the stator elements and the piston elements is a plurality of teeth spaced apart from each other in a direction parallel to the longitudinal axis forming a slot between consecutive ones of the teeth.

18. An electrical linear actuator according to claim 17, wherein adjacent rows of the at least one of the stator elements and the piston elements being a plurality of teeth are arranged in a manner whereby the teeth of adjacent rows are offset from one another.

19. An electrical linear actuator according to claim 18, wherein each of the plurality of teeth of one row is disposed centrally and opposite to a corresponding slot in the adjacent row of the plurality of teeth.

20. An electrical linear actuator according to claim 12, wherein at least each one of the plurality of stator elements and the piston elements is configured in cross-section as a trapezoid.

* * * * *